United States Patent [19]

Palmour, III et al.

[11] 3,900,542

[45] Aug. 19, 1975

[54] PROCESS FOR SINTERING FINELY DIVIDED PARTICULATES AND RESULTING CERAMIC PRODUCTS

[75] Inventors: Hayne Palmour, III; Marvin L. Huckabee, both of Raleigh, N.C.

[73] Assignee: Arthur D. Little, Inc., Cambridge, Mass.

[22] Filed: Apr. 26, 1973

[21] Appl. No.: 354,515

[52] U.S. Cl. ................................. 264/40; 264/66
[51] Int. Cl.² ........................................ C04B 35/64
[58] Field of Search ............................. 264/66, 40

[56] References Cited
UNITED STATES PATENTS

| | | | |
|---|---|---|---|
| 3,711,585 | 1/1973 | Muta | 264/66 X |
| 3,767,745 | 10/1973 | Gazza | 264/66 X |
| 3,792,142 | 2/1974 | Kobayashi | 264/66 X |

*Primary Examiner*—Robert F. White
*Assistant Examiner*—Thomas P. Pavelko
*Attorney, Agent, or Firm*—Bessie A. Lepper

[57] ABSTRACT

Process for forming a sintered ceramic structure having improved properties. After precompaction of finely divided particulate material to form a sinterable green structure, the green structure is heated until the onset of shrinkage. Sintering is then carried out in at least three sequential steps during which density increase is attained at decreasing rates, the rates of all but the last step being linear and that of the last step being continually decreasing. In the case of alumina, the resulting ceramic has a very uniform, fine grain structure.

24 Claims, 6 Drawing Figures

PROCESS FOR SINTERING FINELY DIVIDED PARTICULATES AND RESULTING CERAMIC PRODUCTS

This invention relates to ceramics and more particularly to the formation of ceramic bodies by sintering and to the resulting sintered material.

The term "ceramics" is generally applied to high-melting point nometallic inorganics, normally metallic oxides. Thus the oxides of such metals as aluminum, magnesium, zirconium and thorium are used in the formation of ceramic structures. The term "ceramics" may also include such materials as spinels, jaspers, perovskites, ferrites and the like, as well as carbides (e.g., silicon or titanium carbide) and nitrides (e.g., silicon or aluminum nitride).

Ceramic structures formed of alumina are widely used and may be taken as exemplary of this class of materials. Alumina structures find wide use in electronic applications such as high-frequency insulators, microwave "windows" and substrate materials for thick- and thin-film microcircuit and integrated circuit devices. Highly translucent alumina is used for envelopes for sodium vapor lamps. In addition, alumina ceramics find uses in many applications where high mechanical strength and wear resistance are required such as in cutting tools, grinding equipment components, and the like.

A generally used process for forming ceramic structures or bodies is to first cold press finely divided ceramic particles, normally with an effective quantity of an organic binder which can be removed by subsequent heating, to form a "green" sinterable structure having sufficient strength to be handled and then to subject the green structure to a predetermined sintering cycle after a prefiring step. In sintering the binder, if used, is removed, entrapped gases are driven off and the ceramic forms as a solid structure comprised of strongly bonded grains. The ideal ceramic body after sintering is one which has a fractional density closely approaching the theoretical value, has a minimum intergranular remnant porosity, is substantially free from discontinuous grain growth, and has minimum grain size with a very narrow grain size distribution. The attainment of these desirable properties results in improved dielectric properties, greater strength, better surface finish, as well as the attainment of other advantages.

A number of processes have been developed to sinter ceramic particles in an attempt to achieve the desired ceramic structure. Thus Coble in U.S. Pat. No. 3,026,210 teaches the addition of an MgO dopant as a grain-growth inhibitor for alumina and the sintering in controlled atmospheres such as a vacuum or hydrogen using successive isothermal firing steps at 1000°C to 1200°C and then 1700°C to 1950°C from 6 to 24 hours. The resulting alumina structures are relatively dense, transparent, (highly translucent) polycrystalline bodies. U.S. Pat. No. 3,026,177 teaches the formation of transparent polycrystalline alumina bodies by first firing a precompacted green structure in hydrogen at 1650°C to 1750°C for from 50 to 300 minutes and then firing in hydrogen at 1800°C to 2000°C for not less than 15 minutes.

The prior art recognizes the need for dense, small-grained nontransparent alumina structures for use in electrical components, gas turbine blades and the like. U.S. Pat. No. 3,377,176 teaches in addition of up to 0.1% by weight of grain-growth control agents such as $Y_2O_3$, MgO and mixtures of these oxides. In preparing the $Al_2O_3$ for precompacting it is ground with a lubricant such as oleic, stearic or naphthenic acid. The green compacts are then prefired at 800°C to 1100°C for about 1 hour in air; and sintering to maximum density is accomplished by firing at 1400°C to 1550°C for about 4 hours. The alumina crystal size is of the order of about 2 to 4 microns with substantially none exceeding 5 microns when sintering is done in vacuum or in hydrogen, and from about 3 to 5 microns when fired in air.

U.S. Pat. No. 3,459,564 teaches the addition of CoO to control grain size and a process which comprises prefiring in air at about 1330°C for 1 minute or less and sintering at 1500°C to 1900°C in air or vacuum for several hours to give a translucent material having relatively large grain sizes of over 10 microns. Finally, U.S. Pat. No. 3,311,482 teaches forming a sintered transparent alumina body having average grain sizes in the range of about 7 to 10 microns. Preheating is done slowly in air up to 1500°C and then sintering is accomplished by rapidly heating the preheated body to 1900°C under vacuum for 15 minutes after the body comes up to temperature.

Dense ceramic bodies may also be formed by hot pressing which is a substitute for sintering. Although the resulting ceramics can exhibit high densities and relatively small grain sizes, this process is not economically acceptable, particularly for large commercial scale production of ceramic articles.

It will be seen from this discussion of the prior art that there still remains a need for an improved sintering process which gives rise to smaller, more uniform grain sizes in sintered structures having fractional densities which closely approach theoretical. The ceramic articles resulting from such a process should possess improved physical properties.

It is therefore a primary object of this invention to provide an improved process for forming ceramic bodies and structures, the improvement lying at least in part in attaining better control of microstructure and textural uniformity in the ceramic formed. It is another object of this invention to provide a process of the character described which may be carried out at temperatures which are lower than those presently used without increasing the time of the heating cycle and which thereby decrease the generation of thermal pollution. Yet another object is to provide a ceramic sintering process which may be carried out in air. An additional object of this invention is to provide a sintering process which produces ceramic bodies having small grain size, a narrow grain size distribution and a fractional density closely approaching theoretical.

It is an additional object of this invention to provide an improved process for making alumina bodies and structures wherein the average grain size is about 1 micron, the grain size range is between about 0.75 and about 1.5 microns and the fractional density is at least 0.993.

Still another primary object of this invention is to provide alumina ceramics which have an average grain size of about one micron with a grain size range of between about 0.75 and about 1.5 microns and a fractional density closely approaching theoretical. Yet another object is to provide improved alumina ceramics of the type described which are further characterized as exhibiting improved stability with respect to dielectric losses as a function of frequency, improved mechanical strength and enhanced surface finish. It is an additional object to provide sintered alumina which can be subjected to subsequent thermal treatment to render it translucent or transparent. Other objects of the invention will in part be obvious and will in part be apparent hereinafter.

In the process of this invention after the finely divided ceramic particles have been precompacted to form a "green" structure, the structure is sintered using a sintering cycle comprising at least three sequential rate regimes of progressively decreasing densification rates from the onset of shrinkage. The densification rate in each regime is controlled so that it remains below the critical rate at which gas entrapment is effected and at which discontinuous grain growth is induced. The densification rate in all of the regimes but the last one is linear; and that of the last regime is logarithmically decreasing. Outgassing is essentially completed while the ceramic material is still in the permeable, branching-pore stage of the total densification spectrum. Simultaneously, a favorable topology is maintained for further sintering.

The final ceramic body formed exhibits small grains, a very narrow range of grain size and high fractional density. In the case of alumina ceramics, the grain size averages about one micron, the size range is from about 0.75 to about 1.5 microns and the fractional density is at least 0.993.

For a fuller understanding of the nature and objects of the invention, reference should be had to the following detailed description taken in connection with the accompanying drawings in which.

The invention accordingly comprises the several steps and the relation of one or more of such steps with respect to each of the others, and the article possessing the features, properties, and the relation of elements, which are exemplified in the following detailed disclosure, and the scope of the invention will be indicated in the claims.

The ceramic material to be used in forming the final sintered structure is preferably in the form of finely divided particles, and it is usually selected from the highest purity material attainable, although in some cases impurities can be tolerated. Moreover, the particles should have a high surface area and be of a highly sinterable, chemisorptive character. As an example, commercially available alumina particles of approximately 99.9% purity containing about 0.1% MgO as a deliberate additive, having a size range between about 0.1 and about 0.25 microns and a specific surface area of from 6–11 square meters per gram are particularly suitable for the practice of this invention. It will, of course, be appreciated by those skilled in the art that the particles of alumina, and of other ceramics, may be of any suitable size range normally used in forming sintered bodies.

If desired, very pure starting materials may be used, or small amounts of one or more additives may be mixed in with the ceramic particles to achieve a desired physical effect. Illustrative of such additives are MgO, materials such as $MgCO_3$ which form MgO in situ, and $Y_2O_3$ as grain-growth control agents and CoO as a colorant. Such additives may be introduced through a chemical process, e.g., by coprecipitation, cocrystallization or other techniques prior to calcination, or they may be introduced as mill additions during such subsequent steps as milling and binder addition. In general, such additives are preferably present in amounts no greater than about 0.5% by weight of the ceramic particles being used.

If the finely divided ceramic material to be used has a tendency to agglomerate (and many do), then the starting material should be dry milled or otherwise treated to brake down the agglomerates. In the case of alumina, this is conveniently done dry in a high alumina mill using high alumina balls.

It is usually preferable in forming the green sinterable structure to add to the ceramic particles water or an organic binder which can be vaporized or ignited and burned out of the structure before sintering is begun. The amount of such binder is that which is effective in giving the precompacted green structure sufficient strength to be handled and to retain its integrity during sintering. Generally, this amount will range from about 0.5 to about 5% by weight of the ceramic material and will depend upon the binder used. It is usually desirable to add the least amount of binder required to give the green structure the required strength. Illustrative of suitable binders are water, polyethylene glycol, methyl methacrylate, cellulose, starches and the like.

For dry-pressed articles, the precompacting is preferably accomplished in a hardend material or carbide die using pressures ranging between about 6,400 and 64,000 psi. Precompacting may also be accomplished by any suitable technique other than dry pressing, such as by isostatic molding for example. The density of the resulting green structures including binder may range from about 50 to about 65% of theoretical density; and of the green structures on an ignited, binder-free basis from about 48 to about 63% of theoretical density.

The choice of ceramic material particle size, specific surface area and other surface characteristics, purity, the incorporation of any additives, and the use of any additional steps to eliminate contamination and to attain uniformity of products is within the knowledge of one skilled in the art; and these factors along with their effects on sintered ceramic structures are well known. Moreover, the choice of a binder, the amount used, the precompacting techniques and pressures employed, the choice of binder-free green density and the formation of green structures in general are all part of the known art in forming sintered ceramic structures and need not be detailed further.

It is through a unique series of sintering stages or regimes that the process of this invention achieves a ceramic structure of improved properties. In this unique sintering step, progressively decreasing densification rates are used, thereby making the densification rate an independent variable which is deliberately controlled while sintering temperature becomes, in effect, a dependent and often nonlinear variable. However, once the regimes are established in terms of densification rates, temperature regimes may be subsequently substituted in effecting the necessary control in the production of ceramic articles.

During sintering the fractional density is increased through at least three sequential rate regimes, these rate regimes being performed to achieve progressively decreasing densification rates. All but the last of these decreasing densification rates are substantially linear, the last being logarithmic. The first regime begins at the onset of shrinkage which can conveniently be determined by detecting a decrease in one or more linear dimensions. Normally, shrinkage begins at or below about 1000°C and at this temperature the binder has been effectively removed and outgassing begins. The heating of the structure to the onset of shrinkage may be carried out as a separate prefiring step or may be continuous with the sintering step.

Figure 1:
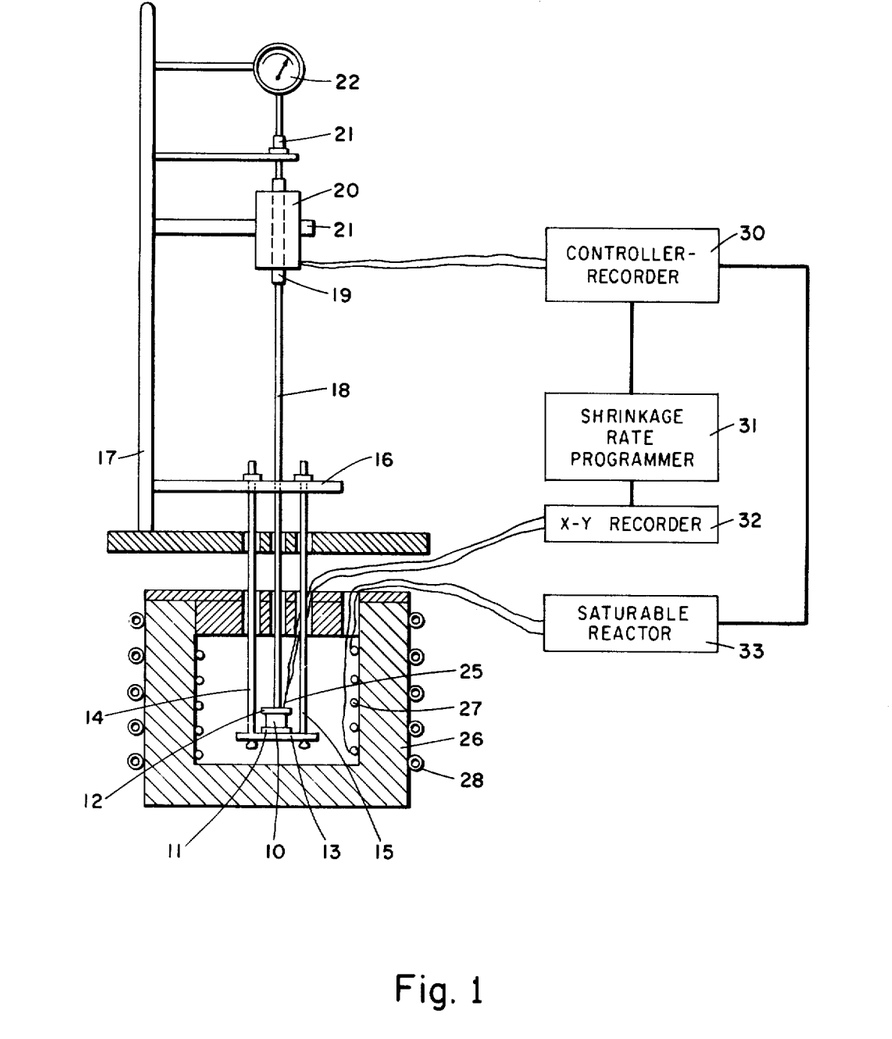
FIG. 1 is a simplified sketch or an apparatus suitable for determining the densification rate of a sample ceramic body during sintering by the multiple-regime sintering process of this invention.

Although the apparatus used in the continuous determination of density is not part of this invention, it is sketched diagrammatically in FIG. 1 to illustrate one means for determining a suitable time-density profile used in turn to define a time-temperature profile for commercial-scale operation. This apparatus of FIG. 1 has been described in the literature. (See for example H. Palmour and D. R. Johnson, pp. 779–791 in G. C. Kuczynski, et al., (eds.) "Sintering and Related Phenomena" Gorden and Breach, New York, 1967).

The sample 10 to be sintered is placed between two shimes 11 and 12 of dense alumina and set upon a sapphire stage 13 which in turn is supported from three sapphire rods, two of which are shown at 14 and 15 fixed to a horizontal support bar 16 mounted on a main vertical support rod 17. A vertically aligned sapphire displacement measuring probe 18 rests upon the top shim 12 and is connected to core 19 of a linear variable differential transformer 20 which in turn is connected to a micrometer screw 21 for initial adjustment and thereafter by removal of micrometer screw 21 to a precision dial gauge 22. These last-named components are also supported through horizontal support members by main vertical support rod 17. A Pt-Pt$_{90}$Rh$_{10}$ thermocouple 25 is used to measure the sample temperature. Heating is accomplished within a furnace 26 having platinum resistance windings 27 and external cooling coils 28. A suitably apertured cover 29 fits over the furnace.

The apparatus of FIG. 1 is designed to control shrinkage, rather than temperature, at a predetermined rate. The electronic signal from the displacement transducer (the linear variable differential transformer 20) is fed into the controller-recorder 30, the magnitude of this signal varying with the movement of probe 18 as the height of sample 10 decreases with increasing density. The controller 30 is connected to the shrinkage rate programmer 31 which compares the instantaneous height of sample 10 with a point on a programmed height-time curve and simultaneously records the records the thermocouple temperature on recorder 32. The controller-recorder 30 is connected to saturable reactor 33 which in turn controls the furnace temperature through its connection with the platinum resistance windings 27. Deviations from the program curve are offset by adjustments in the furnace power. The apparatus can be turned to minimize the allowable deviations from the program by selecting optimum values of the controller's proportional band, rate time and reset rate. The operation of the apparatus will be illustrated in the example given below.

The densification of the green structure must at all times be carried out at a rate below the critical rate for any one stage. The critical rate may be defined as the densification rate which enhances to a significant degree (1) the premature pinching-off of branching pores, (2) the entrapment of gas, and (3) the effecting of excessive and/or discontinuous grain growth.

A preferred densification rate $dD/dt$ for the first regime for alumina is about 0.0075 minute$^{-1}$ from the onset of shrinkage at or below about 1000°C until the fractional density reaches approximately 0.75. The densification rate for the second regime is then preferably dropped to about 0.0025 minute$^{-1}$ (about one-third that of the first regime) until the fractional density reaches about 0.85. During this second regime it is believed that the structure being sintered is still in the permeable, branching-pore stage and that conditions are such as to produce a favorable topology for further sintering.

The third and last densification regime is carried out, not at a linear rate, but at a rate which is continually decreasing. That is, the fractional density attained is proportional to the logarithm of time rather than being a linear function of time. Hence, in this regime the densification rate $R$ may be expressed as $K/t$, where $K$ is a predetermined constant and $t$ is time.

The optimum rates for each of the three densification rate regimes of the sintering step will be selected to be acceptable to the ceramic material being processed, to the capabilities of the kiln being used, and to the geometric constraints of the structure itself; and these rates will be influenced by the desired density and grain size of the final sintered body. In defining these densification rate ranges it is first necessary to define the transition points at which the rates are successively decreased. The first transition point, subsequent to the onset of shrinkage, comes when the body being sintered reaches between about 0.70 and about 0.75 fractional density; and the second transition point when it reaches between about 0.82 and about 0.87 fractional density. Exemplary rates for a relatively bulky sample body using a sintering time of about 4.5 hours from the onset of shrinkage may be cited. Thus in such a case the densification rate between the onset of shrinkage (densification) and the first transition point should be no greater than 0.01 minute$^{-1}$; and the densification rate between the first and second transition rates should be no greater than one-half the first densification rate, and preferably lower, i.e., as low as one-fourth or one-fifth of the first rate. If the configuration and cross section of the body being sintered are such as to make faster firings tolerable and/or desirable, then essentially the same density/time profile will be used but sintering will be carried out over a compressed time base.

In establishing the third, logarithmically decreasing densification rate, it is necessary to determine first what portion of the total heating cycle from shrinkage onset is to be devoted to this last regime. Normally, from about 50 to 65% of this heating period will be used in the regime during which the density changes as a function of a logarithm of time and therefore determines the progressively decreasing rate $R$ as a function of $K/t$. This third regime is, of course, continued until maximum fractional density is attained.

The process of this invention may be described further with respect to the following examples which are meant to be illustrative and not limiting.

Weighed charges of about 0.9 gram of ball-milled $Al_2O_3$ powder (99.9% pure with about 0.1% added MgO and ranging in particle size from 0.1 to $0.25\mu$ with a specific surface area between 6–11 meter$^2$/gram) containing 5% by weight of a polyethylene glycol binder were pressed at 30,000 psi in a steel die (0.315 inch in diameter) to yield green compacts configured as right circular cylinders. Metal markings were removed from these structures by abrading with a nylon fabric. The green densities (with binder) of the $Al_2O_3$ compacts ranged between 59 and 63% theoretical which was taken to be 3.986 grams/cm$^3$ and the densities of the compacts on an ignited, binder-free basis were between 55 and 59% theoretical. By reasonable control of experimental procedures, compacted specimens having a constant fractional green density of about 0.58 on a binder-free basis could be produced and were used in preference to those in which the green density varied from specimen to specimen. The total weight loss on ignition exceeded that attributable to the binder addition by more than 1%; but this was not unexpected since retention of volatiles to high temperatures is not inconsistent with the chemisorptive character of the finely divided, high-surface-area material used.

The apparatus shown in FIG. 1 was used to monitor $dD/dt$, the rate at which density increased with time. Shimes of dense $Al_2O_3$ ceramic, about 0.020 inch thick, were used above and below the compact specimen to separate it from the sapphire support stage and probe rod and to assure uniform distribution of the very small stress (less than 10 psi) resulting from the weight of the vertically aligned displacement measuring probe. The compacts were heated in air at a constant rate, $dT/dt$, (being about 10°C per minute) to the onset of shrinkage which occurred at or below about 1000°C. At that point, the instrumentation was quickly readjusted, the controller input was switched to the displacement (LVDT) sensor, and the rate-control sintering sequence was initiated under automatic control, following a preplanned height-time profile designed to yield the desired density-time relation. Minor variations in green density of the compacts were compensated for by small adjustments in the point of initiation of the program so that the transition points in the program were attained (within experimental limits) at the intended fractional densities. Rate effects per se were compared for constant relative density profiles simply by altering the time base (over the range 2.25 to 9 hour). This alteration was accomplished by changing the programmer chart durm drive gears in otherwise identically programmed firings.

The entire sintering process was carried out in an air atmosphere. However, it is within the scope of this invention to use other atmospheres such as hydrogen or helium or to perform all or a part of the sintering step in vacuum.

A number of different temperature-time and density-time profiles were examined as listed in Table 1.

Table 1

Sintering Control Programs for $Al_2O_3$
and Resultant Fractional Densities and Grain Sizes

| Sintering Program Control | Time from Shrinkage Onset, Min. | Max. Temp. °C | Measured Fractional Density | Grain Size Range, $\mu$ |
|---|---|---|---|---|
| Constant heat rate | | | | |
| ≈ 10°C/min | 90 | 1580 | 99.0 | 1.0–4.0 |
| ≈ 17.5°C/min | 60 | 1580 | 99.1 | 1.0–3.0 |
| (a) conventional temp. schedule | 260 | 1530 | 99.6 | 2.0–4.0 |
| Rate control | | | | |
| (b) linear-linear | 260 | 1485 | 98.0 | 1.0–3.0 |
| (c) linear-linear-log decreasing | 260 | 1445 | 99.3 | 0.75–1.5 |

Figure 2:
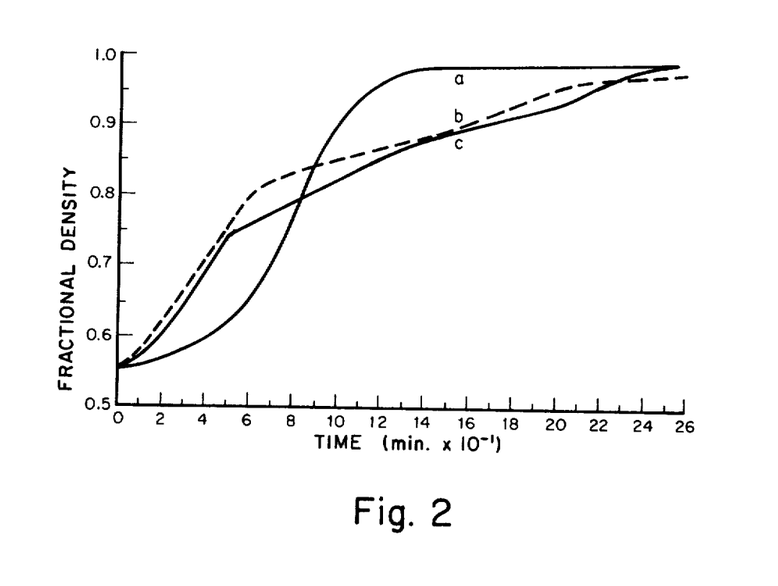
FIG. 2 is a plot of density as a function of time from onset of shrinkage for sintering alumina by two prior art processes and the process of this invention.

FIG. 2 is a plot of density as a function of time from the onset of shrinkage for the sintering of the $Al_2O_3$ by (a) conventional isothermal firing schedule, (b) linear-linear rate-controlled densification and (c) linear-linear-log decreasing rate-controlled densification of this invention.

The conventional (a) curve of FIG. 2. increased gradually from about 55 to about 67.5% theoretical density (about 70 minutes after onset), proceeded at a rapid, almost linear rate to 87% density (at about 75 minutes) and then continued at a steadily decreasing rate. Densification was essentially complete before the beginning of the 2-hour isothermal soak period. The rate-controlled profiles (b) and (c) were never truly isothermal. All three of the sintering processes required essentially the same time (4.5 hours) from the onset of shrinkage to the attainment of maximum density.

A comparison of curves (b) and (c) representing two different rate control processes, shows higher final densities were obtained using the three-regime process of this invention. Moreover, Table 1 shows that the grain size range was effectively halved by using the three-regime process. This major reduction in grain size range would be expected to increase the strength of the sintered ceramic material by a factor proportional to $1/\sqrt{d}$ where $d$ is the grain diameter.

Figure 3:
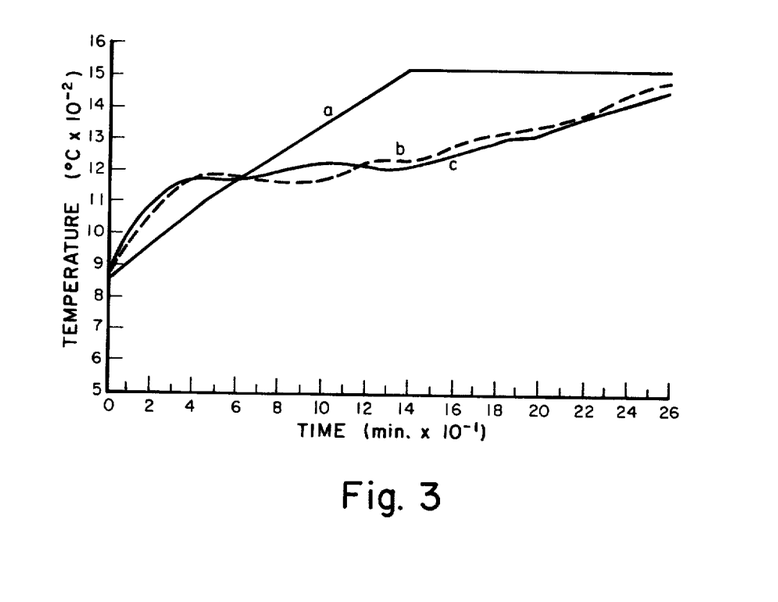
FIG. 3 is a plot of temperature as a function of time from onset of shrinkage for sintering alumina by two prior art processes and the process of this invention.

FIG. 3 is a plot of temperature as a function of time from the onset of shrinkage for firing scedules (a), (b) and (c) on Table 1, these designations applying to the same schedules so identified in FIG. 2. It will be seen from FIG. 3 that the rate-controlled sintering process of this invention achieved the same density over the same time base at a temperature some 85°C lower than the conventional firing schedule and 40°C lower than the linear-linear schedule (b). In terms of thermal energy input, the process of this invention appears to offer a more efficient way of densifying ceramics.

Once the optimal density-time and temperature-time relationships have been determined, the independent the dependent variables may be reversed and temperature can serve as the control variable as a function of time in achieving rate-controlled sintering in otherwise conventional kilns.

Figure 4:
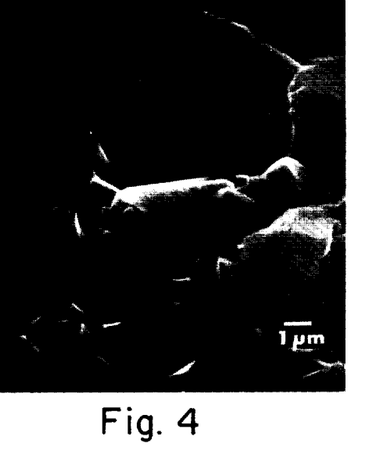
FIGS. 4 and 5 are photomicrographs of alumina sintered by two different prior art processes.
Figure 5:
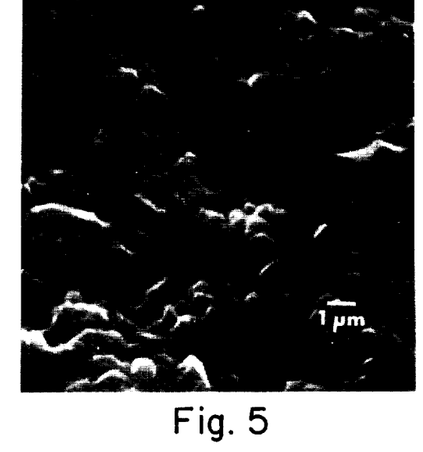
Figure 6:
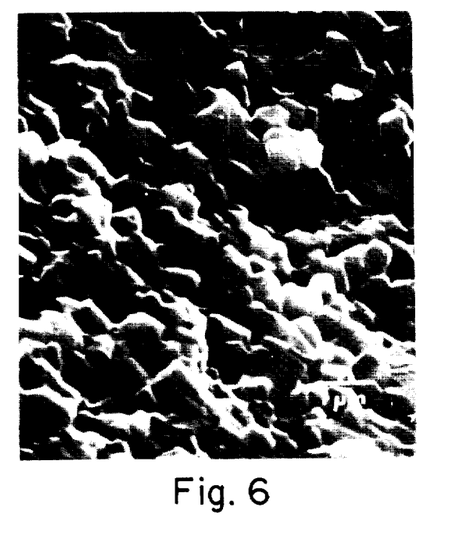
FIG. 6 is a photomicrograph of alumina sintered by the process of this invention.

Finally, the photomicrographs of FIGS. 4–6 illustrate the marked differences in the microstructures of the sintered $Al_2O_3$. FIG. 4 shows the fracture surface, obtained through the use of a scanning electron microscope, of the sintered $Al_2O_3$ formed using sintering schedule (a) of Table 1; FIG. 5 the fracture surface of $Al_2O_3$ using sintering schedule (b) of Table 1; and FIG. 6 the fracture surface of $Al_2O_3$ using sintering schedule (c) of this invention.

It will be seen from a comparison of FIGS. 4 and 6 that the sintering process of this invention reduces the grain size by a factor of 3 or more and produces a more uniform grain size distribution. The grain size in FIG. 4 is seen to be bimodal with an appreciable fraction of larger, more angular grains, whereas the grains of FIG. 6 are much more uniform.

An examination of FIG. 5 (linear-linear controlled rate (b) of Table 1) shows some indications of entrapped branching pores, though to be indicative of excessive densification rates in the open porosity range, i.e., at or below about 85% of theoretical density. This interpretation is borne out by noting the marked improvement in final density and fine uniform microstructure shown in FIG. 6 when contrasted with FIG. 5.

It may be postulated that the combination of small grain size, very narrow grain-size range and absence of pores achieved by the process of this invention (FIG. 6) is the result of using densification rates which prevented premature pore closure and hence permitted gas evolution along branching, connecting pores until essentially all of the gas was removed; the use of the densification rates also essentially prevented discontinuous grain growth which in normally fired ceramics gives rise to bimodal grain size.

The final alumina ceramic formed by the process of this invention may be characterized as having an average grain size of about one micron, a grain-size distribution of from about 0.75 to about 1.5 microns, and a fractional density of over 0.99. Examination of FIG. 6 shows that a few of the grains are less than one micron in size, e.g., as small as about 0.75 microns and that only a minor portion of them are larger than about one micron. The ceramic may be further characterized as being substantially free from discontinuous grain growth, and having very small intergranular remnant porosity, uniform distribution of pore and grain sizes and good textural uniformity. These improved characteristics in turn permit the ceramic structure to display greater strength, more uniform and stable dielectric properties, and more desirable surface properties. These advantages may be illustrated further using well-known observations. For example, since fineness of grain size (especially with regard to the largest size fractions present) is probably the most important determinant of strength in a dense ceramic of a given composition (see for example S. C. Carniglia, *Journal of the American Ceramic Society*, 55 (5) 243–249 (1972)), it follows that the enhanced control of miscrostructure to give the very small grain sizes and the very narrow grain size range which results from the process of this invention gives rise to significant improvements in reproducibly attainable strength levels. The transverse rupture strength of a sintered ceramic body is known to be proportional to $1/\sqrt{d}$ where $d$ is the grain diameter. Thus by reducing the maximum grain size from about 5 microns (see U.S. Pat. No. 3,377,176) to 1.5 microns it is possible through the practice of this invention in principle to increase the strength of the ceramic by a factor of as much as $\sqrt{5}\sqrt{1.5}$ or about 1.8. If average grain sizes of 2 and 1 microns are assumed, than in principle the strength is increased by a factor of as much as 1.4 when the grain size is essentially halved. Since ceramics are often chosen primarily because of their strength properties, increase in strength is an important attainment.

In like manner, it is known that the more uniform the grain size distribution is in a ceramic the better is the frequency dispersion; and the fewer the pores the better is its performance in electronic circuitry components. Finally, it may also be pointed out that small-grain, pore-free, dense ceramics such as alumina can be fired or polished to form very smooth surfaces such as are required for thread guides in the textile industry and as substrates for a wide variety of electronic devices.

Ceramics formed by the process of this invention having small and very uniform grain size can be used as blanks for subsequent thermal treatment, e.g., high temperature firing, to make translucent or transparent bodies. This subsequent thermal treatment may be done by known techniques such as high-temperature sintering, hot pressing, hot molding, press forging and the like, and may be carried out in vacuum or in a selected atmosphere, e.g., hydrogen.

It will thus be seen that the objects set forth above, among those made apparent from the preceding description, are efficiently attained, and since certain changes may be made in carrying out the above process and the article set forth without departing from the scope of the invention, it is intended that all matter contained in the above description or shown in the accompanying drawings shall be interpreted as illustrative and not in a limiting sense.

We claim:

1. In a process for forming sintered ceramic structures including the steps of compacting finely divided particulate material, with or without an ignitable binder, to form a green structure and then heating the green structure to the onset of shrinkage, the improvement comprising sintering the heated green structure through three sequential rate regimes of progressively decreasing densification rates from said onset of shrinkage, the said densification rate in each regime being below the critical rate at which gas entrapment is effected and discontinuous grain growth is induced, the third of said regimes being continually decreasing and the first and second of said regimes being linear; said first of said regimes being defined between said onset of shrinkage and the attainment of between about 0.70 and about 0.75 fractional density; said second of said regimes being defined between about 0.70 and 0.75 fractional density and the attainment of between about 0.82 and about 0.87 fractional density; and said third of said regimes being defined between about 0.82 and about 0.87 fractional density and the attainment of final density.

2. A process in accordance with claim 1 wherein said finely divided particulate material contains up to 0.5% of an additive.

3. A process in accordance with claim 2 wherein said additive is a grain-growth inhibitor.

4. A process in accordance with claim 1 wherein said finely divided particulate material is alumina.

5. A process in accordance with claim 1 wherein said third of said regimes requires from about 50 to about 65% of the time devoted to said sintering from said onset of shrinkage to the end of sintering heat input.

6. a process for sintering finely divided ceramic particles to form ceramic structures, comprising the steps of
   a. precompacting finely divided ceramic particles to form a sinterable structure having a density of between about 48 and 63% of theoretical on a binder-free ignited basis; and
   b. thereafter subjecting the resulting sinterable structure to a sintering cycle comprising three sequential rate regimes of progressively decreasing densification rates from the onset of shrinkage, the said densification rate in each regime being below the critical rate at which gas entrapment is effected and discontinuous grain growth is induced, the first and second of said rate regimes being linear and the last of said rate regimes being one which is continually decreasing; said first of said regimes being defined between said onset of shrinkage and the attainment of between about 0.70 and about 0.75 fractional density; said second of said regimes being defined between about 0.70 and about 0.75 fractional density and the attainment of between about 0.82 and about 0.87 fractional density; and said last of said regimes being defined between about 0.82 and about 0.87 fractional density and the attainment of final density.

7. A process in accordance with claim 6 including the step of milling said ceramic particles to eliminate agglomerates prior to said precompacting step.

8. A process in accordance with claim 6 including the step of adding an ignitable binder to said ceramic particles prior to said precompacting step.

9. A process in accordance with claim 6 including the step of incorporating up to about 0.5% by weight of an additive with said ceramic particles prior to said step of precompacting.

10. A process in accordance with claim 9 wherein said additive is a grain-growth inhibitor.

11. A process in accordance with claim 1 wherein said steps of precompacting and subjecting to a sintering cycle are carried out in an air atmosphere.

12. A process in accordance with claim 6 wherein the densification rate of said second of said regimes is between about one-fifth and one-half the densification rate of said first of said regimes and said third of said rate regimes is logarithmically decreasing.

13. A process in accordance with claim 6 wherein said third of said regimes requires from about 50 to about 65% of the time devoted to said sintering from said onset of shrinkage to the end of sintering heat input.

14. A process of forming a dense alumina structure of fine, uniform grain size, comprising the steps of
   a. precompacting finely divided alumina particles to form a sinterable structure having a density of between about 48 and 63% of theoretical on a binder-free ignited basis; and
   b. thereafter subjecting the resulting sinterable alumina structure to a sintering cycle comprising three sequential rate regimes of progressively decreasing densification rates from the onset of shrinkage, the said densification rate in each regime being below the critical rate at which gas entrapment is effected and discontinuous grain growth is induced, the first and second of said rate regimes being linear and the third rate regime decreasing logarithmically; said first of said regimes being defined between said onset of shrinkage and the attainment of between about 0.70 and about 0.75 fractional density; said second of said regimes being defined between about 0.70 and about 0.75 fractional density and the attainment of between about 0.82 and about 0.87 fractional density; and said third of said regimes being defined between about 0.82 and about 0.87 fractional density of final density.

15. A process in accordance with claim 14 including the step of milling said finely divided alumina to eliminate agglomerates prior to said precompacting step.

16. A process in accordance with claim 14 including the step of adding up to about 0.5% by weight of MgO, $Y_2O_3$ or a mixture of MgO and $Y_2O_3$ to said alumina particles prior to said precompacting step.

17. A process in accordance with claim 14 including the step of adding an organic ignitable binder to said alumina particles prior to said precompacting step.

18. A process in accordance with claim 14 wherein said alumina particles range in size between about 0.1 and 0.25 microns and are characterized as having a specific surface area of from 6 to 11 square meters pre gram.

19. A process in accordance with claim 14 including the step of thermally treating the sintered structure at temperatures to render it transluent or transparent.

20. A process in accordance with claim 14 wherein the densification rate of said first of said regimes is no greater than 0.01 $\text{minute}^{-1}$, and the densification rate of said second of said regimes is between about one-fifth and one-half the densification rate of said first of said regimes.

21. A process in accordance with claim 14 wherein said third of said regimes requires from about 50 to about 65% of the time devoted to said sintering from said onset of shrinkage to the end of sintering heat input.

22. A process in accordance with claim 14 wherein said first of said regimes is defined between the onset of shrinkage and the attainment of about 0.75 of theoretical density with a densification rate of about 0.0075 $\text{minute}^{-1}$ and said second of said regimes is defined between the attainment of about 0.75 and the attainment of 0.85 theoretical density with a densification rate of about 0.0025 $\text{minute}^{-1}$.

23. A process of forming a dense ceramic structure of fine, essentially uniform grain size, comprising the steps of
   a. precompacting finely divided ceramic particles to form a sinterable structure having a density of between about 48 and 63% of theoretical on a binder-free ignited basis;
   b. prefiring said sinterable structure to the onset of shrinkage;
   c. thereafter subjecting the resulting prefired structure to a sintering cycle comprising three sequential rate regimes of progressively decreasing densification rates, the said densification rate in each regime being below the critical rate at which gas entrapment is effected and discontinuous grain growth is induced, the first and second of said rate regimes being linear and the third of said rate regimes being one which is continually decreasing; said first of said regimes being defined between said onset of shrinkage and the attainment of between about 0.70 and 0.75 fractional density; said second of said regimes being defined between about 0.70 and about 0.75 fractional density and the attainment of between about 0.82 and 0.87 fractional density; and said third of said regimes being defined between about 0.82 and about 0.87 fractional density and the attainment of final density;

d. monitoring the change in temperature during said three sequential regimes thereby to obtain a time-temperature curve corresponding to the desired time-densification program; and e. using said time-temperature curve to program the repetition of said process.

24. A process in accordance with claim 23 wherein said third of said rate regimes is one which is logarithmically decreasing.

* * * * *